Patented Sept. 29, 1942

2,297,531

UNITED STATES PATENT OFFICE 2,297,531

TERTIARY AMINES

Louis H. Bock, Glenside, Pa., assignor to Röhm & Haas Company, Philadelphia, Pa.

No Drawing. Application July 16, 1940, Serial No. 345,774

16 Claims. (Cl. 260—584)

This invention relates to tertiary amines having two substituents carrying ether groups and to a practical, efficient method for their preparation.

It has heretofore been proposed to synthesize di-(alkoxymethyl)-methylamines having small alkyl groups by reacting a lower primary alcohol, aqueous formaldehyde, and aqueous methylamine. This method, however, is an inefficient one, giving low yields, and being limited to relatively short chain primary alcohols.

It is now found that tertiary amines of the formula $$(ROCH_2)_2NR'$$

wherein R represents a primary or secondary (i. e., a non-tertiary) hydrocarbon group or a non-tertiary open chain group containing carbon atoms, interrupted by oxygen or sulfur, and R' represents a lower alkyl group, are obtained by reacting a primary or secondary alcohol with anhydrous formaldehyde and a monoalkylamine-formaldehyde condensate.

The alcohol may be any primary or secondary alcohol. Typical alcohols are methyl, ethyl, propyl, isopropyl, butyl, isobutyl alcohols, the various primary and secondary amyl alcohols and mixtures thereof, capryl, octyl, dodecyl, dicapryl, octadecyl alcohols, and other homologues of this series, allyl, methallyl, undecenyl, 9,10-octadecenyl, and other unsaturated aliphatic alcohols, cyclohexanol, hexahydrobenzyl alcohol, benzyl alcohol, phenylethyl alcohol, etc. There may likewise be used alcohols in which the aliphatic or arylaliphatic carbon chain is interrupted by oxygen or sulfur atoms, as in the monoalkyl ethers of the glycols. Typical interrupted alcohols include methoxyethyl, ethoxyethyl, or butoxyethyl alcohols, ethoxyethoxyethyl alcohol, ethoxypropyl alcohol, phenoxyethyl alcohol, the various alkylaryloxyalkyl alcohols, such as cresoxyethyl, isopropylphenoxyethyl, butylphenoxypropyl, octylphenoxyethyl, phenoxyethoxyethyl alcohol, naphthoxyethyl alcohol, phenylthioethyl alcohol, ter-butylphenylthioethyl alcohol, etc.

To supply anhydrous formaldehyde, there may be used gaseous formaldehyde, a solution of formaldehyde in an organic solvent, or, most conveniently, a solid polymer of formaldehyde such as commercial paraformaldehyde, which is readily convertible by heat to formaldehyde. The polymers include the trioxymethylenes or any of the polyoxymethylenes.

The monoalkylamine-formaldehyde condensates are obtained by reacting formaldehyde and a lower monoalkylamine, such as methylamine, ethylamine, butylamine, isobutylamine, or amylamine. As is known, the intermediate condensate, R'—N=CH$_2$, wherein R' is a lower alkyl group, readily polymerizes, usually to give triamines. Typical of these are hexahydro-1,3,5-trimethyl-s-triazine and hexahydro-1,3,5-triisobutyl-s-triazine. The monoalkylamine formaldehyde condensates may be considered to have the general composition $(R'—N=CH_2)_x$, while the formula for the trimer may be written

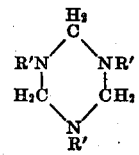

The reaction of a non-tertiary alcohol, formaldehyde, and monoalkylamine-formaldehyde condensate proceeds apparently according to the equation $$(R'—N=CH_2)_3 + 6ROH + 3HCHO \rightleftharpoons 3(ROCH_2)_2NR' + 3H_2O$$

The exact proportions of the equation, however, are not essential, smaller or larger proportions of reactants being feasible. It is frequently desirable to start with an excess of formaldehyde. It is also desirable under most conditions to work with an excess of alcohol.

The three reactants may be mixed directly or in an organic solvent such as naphtha, benzene, toluene, etc. The reaction mixture is heated to start the reaction and the desired reaction occurs at temperatures as low as about 50° C., where the most volatile alcohol and solvents begin to boil. Higher temperatures may be used when higher boiling alcohols or solvents are used or when the reaction is performed in a closed container and under pressure. When long chain alcohols are used, it is advisable to use a solvent in order to facilitate separating the water of reaction without driving off an excessive amount of formaldehyde. To avoid excessive loss of formaldehyde it is preferred that the reaction be performed below 135° C.

As removal of water shifts the equilibrium in favor of the desired compound, the water of reaction should be separated from the reaction mixture by a suitable method. When alcohols or inert solvents or mixtures thereof are used which are only slightly miscible with water and which permit refluxing, the condensed liquids may be collected in a trap and the water then separated. In some cases the water may be removed by distillation of the alcohol or by distillation of an azeotropic mixture. The water of reaction may also be absorbed by a drying agent, such as magnesium or calcium sulfate.

As the water is removed, the reaction proceeds to practical completion. The reaction product may be concentrated by evaporation of excess alcohol or solvent. In the case of the dioxymethyl amines having substituents of short or medium chain length the products may be purified by distillation under reduced pressure.

The following examples illustrate the preparation of these amines.

Example 1

A mixture consisting of 43 parts of hexahydro-1,3,5-trimethyl-s-triazine, 141 parts of absolute ethyl alcohol, 200 parts of isohexane (boiling at about 60° C.), and 30 parts of paraformaldehyde was placed in an apparatus consisting of a flask equipped with stirrer and a distilling column packed with glass rings. At the head of the column there was a condenser from which condensed liquid was collected in a separatory tube permitting the collection and removal of water and the return of solvent to the flask. The mixture in the flask was heated to 55° C., where refluxing occurred. Distillate, consisting of solvent, water, and some alcohol, was collected in the separatory tube and the reaction continued until 60 parts of water had been removed. The solvent was then distilled from the flask and the reaction product distilled at 30 mm. pressure over the temperature range of 64 to 67° C. The distilled product was a liquid amounting to 71 parts. It consisted chiefly of $(C_2H_5OCH_2)_2NCH_3$ with a small amount of unreacted hexahydro-1,3,5-trimethyl-s-triazine.

Example 2

A mixture was prepared from 43 parts of hexahydro-1,3,5-trimethyl-s-triazine, 148 parts of butanol, 30 parts of paraformaldehyde, and 200 parts of a petroleum ether boiling between 60° and 100° C. The mixture was placed in a flask equipped with a stirrer and a reflux column having a trap for removal of water and return of solvent. The mixture was stirred and heated to give rapid reflux until 19 parts of water had been collected. The solvent was then distilled from the flask and the liquid remaining purified by distillation at 15 mm. pressure over the range of 109° to 112° C. The yield of the desired product, $(C_4H_9OCH_2)_2NCH_3$, a liquid, was 172 parts.

The above method was found equally satisfactory for other aliphatic alcohols whether primary or secondary. For example, by substitution of 260 parts of capryl alcohol for the above butanol there is obtained a basic liquid, $(C_8H_{17}OCH_2)_2NCH_3$, having secondary aliphatic hydrocarbon radicals in the oxymethyl substituents.

Example 3

A mixture of 22 parts of hexahydro-1,3,5-trimethyl-s-triazine, 186 parts of dodecanol, 200 parts of petroleum ether boiling between 60° C. and 100° C., and 15 parts of paraformaldehyde was reacted as in Example 2. The solvent was removed under reduced pressure to give a residual material consisting of 86% of $$(C_{12}H_{25}OCH_2)_2NCH_3$$

Example 4

A mixture consisting of 43 parts of hexahydro-1,3,5-trimethyl-s-triazine, 144 parts of methallyl alcohol, 200 parts of petroleum ether boiling between 60° and 100° C., and 30 parts of paraformaldehyde was reacted as in Example 2. The solvent was distilled from the reaction products, which was then purified by distillation under reduced pressure. A yield of 166 parts of product was obtained between 124° C. at 32 mm. and 125° C. at 28 mm. The product consisted of

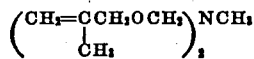

of 97% purity.

Example 5

A mixture of 43 parts of hexahydro-1,3,5,-trimethyl-s-triazine, 200 parts of cyclohexanol, 200 parts of petroleum ether boiling between 60° and 100° C., and 30 parts of paraformaldehyde was reacted as in Example 2. Solvent and other volatile materials were removed by heating under vacuum. A liquid remained which contained by analysis 5.53% nitrogen, corresponding to dicyclohexyloxymethyl methylamine.

Example 6

A mixture of 43 parts of hexahydro-1,3,5,-trimethyl-s-triazine, 216 parts of benzyl alcohol, 200 parts of petroleum ether boiling between 60° and 100° C., and 30 parts of paraformaldehyde was reacted as in Example 2. Solvent and volatile materials were removed by vacuum distillation. A liquid residue remained which contained by analysis 86% of $(C_6H_5CH_2OCH_2)_2NCH_3$.

The tertiary amines of this invention are generally basic liquids, which are soluble in organic solvents. They are decomposed by water. They may be reacted with alkylating agents to give quaternary ammonium salts. The new tertiary amines are of interest as insecticides, germicides, corrosion inhibitors, plasticizers, etc.

I claim:

1. A method for preparing tertiary amines having two substituents carrying ether groups, which comprises reacting a member of the class consisting of anhydrous formaldehyde and polymers of formaldehyde with a monoalkylamine-formaldehyde polymer and an alcohol selected from the class consisting of primary and secondary alcohols and removing the water of reaction.

2. A method for preparing tertiary amines having two substituents carrying ether groups, which comprises reacting by heating paraformaldehyde and hexahydro-1,3,5-trimethyl-s-triazine with a compound selected from the class consisting of primary and secondary alcohols and removing the water of reaction.

3. A method for preparing tertiary amines having two substituents carrying ether groups, which comprises reacting by heating a member of the class consisting of anhydrous formaldehyde and polymers of formaldehyde with a monoalkylamine-formaldehyde polymer and a non-tertiary alcohol, and removing the water of reaction.

4. A method for preparing tertiary amines having two substituents carrying ether groups, which comprises heating between about 50° C. and about 135° C. in an organic solvent a mixture of one mol of a trimer of a monoalkylamine-formaldehyde condensate, at least six mols of a non-tertiary alcohol, and at least three molecular equivalents of a member of the class consisting of anhydrous formaldehyde and polyers of formaldehyde to cause a reaction of these compounds, and removing the water formed during the reaction.

5. A method for preparing tertiary amines having two substituents carrying ether groups, which comprises reacting by heating a member of the class consisting of anhydrous formaldehyde and polymers of formaldehyde with hexahydro-1,3,5-trimethyl-s-triazine and a non-tertiary alcohol, and removing the water of reaction.

6. A method for preparing tertiary amines having two substituents carrying ether groups, which comprises reacting by heating paraformaldehyde and hexahydro-1,3,5-trimethyl-s-triazine with a non-tertiary alcohol and removing the water of reaction.

7. A method of preparing tertiary amines having two substituents carrying ether groups, which comprises reacting by heating a member of the class consisting of anhydrous formaldehyde and polymers of formaldehyde with hexahydro-1,3,5-trimethyl-s-triazine and a primary aliphatic alcohol, and removing the water of reaction.

8. A method of preparing tertiary amines having two substituents carrying ether groups, which comprises reacting by heating paraformaldehyde and hexahydro-1,3,5-trimethyl-s-triazine with a primary aliphatic alcohol, and removing the water of reaction.

9. A method for preparing tertiary amines having two substituents carrying ether groups, which comprises reacting by heating a member of the class consisting of anhydrous formaldehyde and polymers of formaldehyde with hexahydro-1,3,5-trimethyl-s-triazine and a secondary alcohol, and removing the water of reaction.

10. A method for preparing tertiary amines having two substituents carrying ether groups, which comprises reacting by heating paraformaldehyde and hexahydro-1,3,5-trimethyl-s-triazine with a secondary aliphatic alcohol and removing the water of reaction.

11. A compound of the formula $$(ROCH_2)_2NR'$$

wherein R is the carbon-containing radical obtainable from a secondary alcohol by removal of the hydroxyl group therefrom and R' is a lower alkyl group.

12. A compound of the formula $$(ROCH_2)_2NR'$$

wherein R is a hydrocarbon group having a secondary carbon atom attached to the oxygen atom and R' is a lower alkyl group.

13. A compound of the formula $$(ROCH_2)_2NR'$$

wherein R is a secondary aliphatic hydrocarbon group and R' is a lower alkyl group.

14. A compound of the formula $$(ROCH_2)_2NCH_3$$

wherein R is a secondary aliphatic hydrocarbon group.

15. Di(cyclohexyloxymethyl) methylamine.

16. Di(caproxymethyl) methylamine.

LOUIS H. BOCK.